United States Patent [19]

Grimm

[11] Patent Number: 5,638,082
[45] Date of Patent: Jun. 10, 1997

[54] VISION TESTING SYSTEM FOR STEREOSCOPIC VIEWING BY A TEST PERSON

[75] Inventor: Wolfgang Grimm, Heidenheim, Germany

[73] Assignee: Carl-Zeiss Stiftung, Heidenheim, Germany

[21] Appl. No.: 140,464

[22] Filed: Oct. 25, 1993

[30] Foreign Application Priority Data

Oct. 23, 1992 [DE] Germany ............ 42 35 753.5

[51] Int. Cl.⁶ ........................................... G09G 3/18
[52] U.S. Cl. ............................... 345/6; 345/32; 345/88; 359/465; 348/58; 351/201; 351/232; 351/240
[58] Field of Search ............................... 345/4, 5, 6, 7, 345/8, 32, 84, 87, 88, 102, 185, 201; 359/464, 465; 351/201, 215, 232, 239, 240; 348/42, 51, 58

[56] References Cited

U.S. PATENT DOCUMENTS

| | | | |
|---|---|---|---|
| 2,983,835 | 5/1961 | Frey | 313/89 |
| 3,899,786 | 8/1975 | Greubel et al. | 345/32 |
| 4,315,258 | 2/1982 | McKnight et al. | 345/87 |
| 4,415,243 | 11/1983 | Gottlob et al. | |
| 4,870,486 | 9/1989 | Nakagawa et al. | |
| 4,877,309 | 10/1989 | Takamatsu | |
| 5,050,961 | 9/1991 | Venolia | |
| 5,096,520 | 3/1992 | Faris | 156/99 |
| 5,225,822 | 7/1993 | Shiraishi et al. | 345/102 |
| 5,264,964 | 11/1993 | Faris | 359/465 |
| 5,315,377 | 5/1994 | Isono et al. | 348/51 |
| 5,315,695 | 5/1994 | Saito et al. | 345/102 |
| 5,317,393 | 5/1994 | Lee | 348/58 |
| 5,327,285 | 7/1994 | Faris | 359/483 |
| 5,430,496 | 7/1995 | Silverbrook | 395/800 |
| 5,481,737 | 1/1996 | Ito et al. | 395/800 |

FOREIGN PATENT DOCUMENTS

| | | | |
|---|---|---|---|
| 0060986 | 9/1982 | European Pat. Off. | |
| 3043511 | 6/1982 | Germany. | |
| 3214327 | 10/1983 | Germany. | |
| 3509826 | 9/1985 | Germany. | |
| 63-305323 | 12/1988 | Japan | 359/465 |
| 1179914 | 7/1989 | Japan | 345/102 |
| 1448520 | 9/1976 | United Kingdom. | |
| 2111798 | 7/1983 | United Kingdom. | |
| 2231754 | 11/1990 | United Kingdom. | |
| 9110223 | 7/1991 | WIPO | 345/102 |

*Primary Examiner*—Richard Hjerpe
*Assistant Examiner*—Lun-Yi Lao
*Attorney, Agent, or Firm*—Walter Ottesen

[57] ABSTRACT

An image display system comprises polarization spectacles having different polarization axes with or without λ/4-foils of both polarization lenses forward of the eyes of the person to be tested. The system of the invention further includes an image display device for generating light with a specific direction of polarization or a specific rotational direction of the circularly polarized light. The image display device comprises essentially at least one vectograph film and at least one image screen. This arrangement can so influence the light coming from the image screen that test figures or parts thereof can be seen by only one eye or by both eyes. If the image display system is to be used as a vision testing system and the test figures are to be changed, then there is a corresponding command of a drive circuit via a memory. The drive circuit drives the image screen in a suitable manner. A color display can be provided by making an appropriate modification to the image display device.

14 Claims, 7 Drawing Sheets

FIG.1b

Spectacles 5   L 6   R 7

POL II   4

LCD   3

POL I   2

VISION TESTING SYSTEM FOR STEREOSCOPIC VIEWING BY A TEST PERSON

FIELD OF THE INVENTION

The invention relates to an image display system for stereoscopic viewing having an image display unit emitting polarized light. The image display unit has a plurality of individual drivable image display areas on an image screen. The system also includes polarization spectacles which are forward of the eyes of the viewer.

BACKGROUND OF THE INVENTION

Image display systems which provide a stereoscopic viewing impression are already known. These systems operate preferably in that each eye is offered a different color. The stereoscopic viewing impression is then however not very pronounced in most cases. A preferred area of application is in vision testing systems.

Optical test charts and vision testing devices are disclosed, for example, in U.S. Pat. No. 4,415,243 with which a patient is tested for the monocular and binocular vision functions. This check is performed in that the patient looks through a polarization filter in front of each eye at plates illuminated with light having mutually crossed directions of oscillation. These plates have regions with different polarization actions so that the patient can recognize different regions with both eyes. The optical test charts have the disadvantage that the intensity of the luminosity is dependent upon the surrounding luminosity and that, for each test, a plate must be moved manually. Vision testing devices avoid these disadvantages since the plates therein are illuminated from behind and a switchover to another test takes place by remote control with a plate exchange taking place mechanically in the apparatus. The known optical test charts and vision testing apparatus have the common disadvantage that the plates cannot be changed by the person conducting the test without considerable difficulty since the production of the plates is very time consuming.

U.S. Pat. No. 4,870,486 discloses a virtual stereographic image display system wherein a polarizer and a liquid-crystal cell are mounted forward of an image-display surface of a TV-monitor. The light emanating from this image-display system is viewed by a viewer through polarization spectacles with the individual lenses of the spectacles having different polarization axes. This image-display system requires a large space because of the monitor and simply serves to generate virtual stereoscopic image.

A color liquid-crystal image-generating arrangement is disclosed in U.S. Pat. No. 4,877,309 which operates with two liquid-crystal image-generating cells. Two color polarizers are disposed in front of these two image-generating cells and, in addition, a neutral polarizer is disposed at the light-incident side of the first image-generating cell.

This color liquid-crystal image-generating arrangement generates only color images and, taken by itself, is unsuitable for a vision testing system for testing the binocular vision functions.

Published German patent application 3,043,511 discloses an arrangement for testing the function of the eye and of the vision system. The visual display takes place by means of monitors and is for the binocular testing with two monitors having polarizers or with one monitor (red-green stereopsis). This arrangement requires a large space and is usable only in a limited manner for vision testing when using only one monitor.

Furthermore, the arrangement with one monitor provides no stereoscopic viewing impression.

The images generated by the image display system should include letter characters, numbers, symbols, signs, pictures and the like.

SUMMARY OF THE INVENTION

It is an object the invention to provide a compact image display device which provides stereoscopic viewing with an excellent stereoscopic viewing impression.

The image display system of the invention is for stereoscopic viewing by a test person and the system includes: an image display emitting polarized light and having a plurality of image display areas arranged thereon to have a fixed geometrical arrangement to each other; a vectograph film disposed forward of the image display and having a plurality of polarization elements with each of the polarization elements completely covering at least one of the image display areas; the polarization elements being arranged on the vectograph film in strip or checkerboard pattern; each of the polarization elements defining a polarization axis and the respective polarization axes of each two mutually adjacent ones of the polarization elements being mutually perpendicular; polarization spectacles with which the test person can view the image display through the vectograph film; the polarization spectacles having two filter discs having respective polarization foils; the polarization foils having respective polarization axes which are mutually perpendicular and one of the polarization axes of the polarization foils extending in the same direction as the polarization axes of a first portion of the polarization elements and the other one of the polarization axes of the polarization foils extending in the same direction as the polarization axes of a second portion of the polarization elements; and, input means connected to the image display for affecting changes thereon.

The image display system according to the invention can be configured to be very compact and is very flexible in use even though it is compact. The image display system realized by the invention can be assembled without mechanically moving parts whereby the system is very robust, free of wear and not subjected to disturbances. The system of the invention is therefore suitable especially for an application as a stereo television as well as for a compact vision testing apparatus to name only two advantageous areas of application.

As an input unit within the scope of the invention, any arrangement is understood which is suitable to permit a definite selection of the test figures to be displayed via the switching device. This arrangement can be a keyboard, a microphone, a contact surface, an optical sensor, et cetera. The keyboard can also be a conventional keyboard for a computer.

Polarization spectacles in the context of the invention are, for example, a spectacles frame which contains two polarizing filter discs. One filter disc is assigned to the one eye and the second filter disc is assigned to the other eye with the polarization axes or the polarization directions (for circular polarization) of the two polarizing filter discs being perpendicular to each other. A pair of position stabilized contact lenses is also appropriate which can polarize the light incident thereupon.

The polarization elements of the vectograph film in the sense of the invention have an arrangement wherein polarization fields are arranged next to each other. The polarization fields stand perpendicularly to each other on a thin carrier and can have a strip-shaped configuration, a checker board configuration, et cetera. These can be realized, for example, with the aid of a so-called vectograph film which is manufactured by the Polaroid Corporation, Polarizer Division, Norwood, Massachusetts, or as polarizing gratings produced in accordance with a printing process and manufactured by F. Woolley & Co., Inc., Reading, Pa.

The image screen in the context of the invention is understood to be a light-emitting screen such as a flat image screen having a fixed geometric arrangement of the image displaying elements such as a plasma image screen (P-B) or a plasma display panel PDP, an electroluminescence image screen EL-B or an electroluminescence display ELD, a liquid crystal image screen FLK-B or a liquid crystal display LCD, et cetera. Other image screens which have a fixed geometric arrangement of the image display elements are possible.

The term "test person" appears in the following as a synonym for viewer, observer or patient while the word "computer" is synonymous for a computer per se or an electronic data processing system or an electronic data unit.

The areas of the image screen are each drivable individually and must be so aligned with respect to the vectograph film that the area boundaries are contiguous. Furthermore, the areas must be adapted to each other with respect to their size. This does not mean that they must be of the same size. It is also conceivable that the image screen and the vectograph film have different discrete areas. The image screen or the vectograph film with the lower resolution (or lower number of discrete drivable areas) determines then the smallest illustratable signs or areas.

A convenient switchover of the test figures generated by the image display system is obtainable by driving the image screen from a drive circuit having an input unit.

The memory is a fixed pregiven circuit (ASIC, E-PROM, et cetera) or a computer having corresponding software. Any desired test figure can be generated by a simple change of the software when a computer is utilized. Furthermore, the computer permits a very convenient variation in size of the test figures displayed with the figures having any desired shape.

When it is desired to show other test figures, a memory is addressed very quickly via the input unit. By driving the drive circuit of the image screen, the designed image can appear on the image display system. This memory is advantageously located in a computer.

It is advantageous if the image screen is a flat image screen so that the image display system can be configured so as to be very compact.

The illumination in the image display device takes place advantageously by means of one or more light sources when the flat image screen is transilluminated (for example, an LCD-image screen).

A polarization foil I is advantageously placed between the light source and a LCD-element arrangement in order to use a simple LCD-element arrangement. The LCD-element arrangement must then advantageously rotate the light passing therethrough by +45° or −45° so that the light from the image display device can incident upon the polarization spectacles. All light intensity steps between dark and maximum intensity can be generated by a variation of the angle of rotation.

A further embodiment is obtained with a simple LCD-element arrangement if a further polarization foil is arranged between the flat image screen and the vectograph film. Then however, the flat image screen must be so switched that the light passing therethrough is rotated by 90° when maximum light intensity is desired.

Many of the commercially available flat image screens make possible both of the above-mentioned types of operation.

A color display can be provided when at least one of the light sources can be changed with respect to the color of the light emitted.

It is especially advantageous to use a color image screen.

If switchable light filters are on one or more light sources or if light sources of different colors are used, then the chromatic vision of the test person can be evaluated when utilizing the image display system as a vision testing system.

If a color image screen is used as an image screen as disclosed for example in the arrangement of U.S. Pat. No. 4,877,309, then defects in the chromatic vision of the test person can be determined when utilizing the image display system as a vision testing system. Furthermore, the test figures can be displayed in color.

If the light source is varied in its intensity via the drive circuit, then data as to the vision capability of the test person is obtained in dependence upon the light density and the contrast when the image display system is used as a vision testing system.

The polarization axes of the polarization pattern elements of the vectograph film and of the polarization spectacles must be parallel or perpendicular to each other in order to obtain good extinguishment of the unwanted image impression. For this reason, a slight turn of the head of the test person does not provide a definitive image separation for both eyes. This applies for the use of linearly polarized foils. This image separation becomes independent of a turn of the head of the test person when the vectograph film and the polarization spectacles are each equipped with a λ/4-foil so that a circular polarization is produced from the linear polarization. The λ/4-foils effect a rotation polarization which is independent of the position of the head of the test person.

A preferred application of the image display system is seen in its use as a vision testing system.

If the test figures are movable figures when using the image display system as a vision testing system, then further tests of the vision function of the test person can be carried out.

When utilizing the image display system as a vision testing system, the vision testing apparatus of the invention permits a "Wendeprobe" to be realized electronically for the first time for the polatest apparatus known in the art in that the corresponding pixels are simply switched over on the image screen. The "Wendeprobe" is a test wherein a changeover is made between temporal lateral disparity and nasal lateral disparity imaging of the stereo object. More specifically, the images or test figures presented to the left eye are presented to the right eye and vice versa.

A computer can be contained in the housing of the vision testing apparatus which computer is driven by signals (for example, ultrasonic or infrared signals) by the operator of the system. The necessary keyboard is in the hands of the physician or optician and can comprise a single button or it can be configured in the manner of the well-known handheld television controls. These drives transmit a signal which causes the computer contained in the vision testing apparatus to perform an action. The sequence of commands necessary for this purpose is taken by the computer from its memory which can be preferably configured so as to be exchangeable.

Operational reliability of the vision testing system is increased in that all heat generators, which do not necessarily belong in the housing of the system, are removed from the housing and by providing a separate housing therefor.

The electronic vision testing apparatus according to the invention is characterized in that it is very flexible in use notwithstanding its compactness. This apparatus of the invention can be assembled without mechanically moveable parts whereby the apparatus is very robust, free of wear and not subject to disturbances. The apparatus furthermore permits a simple variation in size of the displayed test figures with the figures having any desired configuration. Also, the apparatus permits color vision defects to be determined. For this purpose, a multi-colored image screen is used.

A test of the dynamic vision functions of the test person can be made when utilizing movable test figures. For example, the contrast sensitivity, the adaptation performance and other functions of the sense of vision can be determined by means of the simple variation of the luminous density and of the contrast of the image screen.

The "rotation test" can be electronically realized when applied to binocular testing in accordance with the polatest method. For this purpose, it must only be assured on the image screen that those parts of the test figure, which are shown to only one eye, are switched over for the rotation test for realization by the other eye.

If the test person looks at the image screen without the polarization spectacles, then the vision test can be carried out monocularly or binocularly in accordance with other methods already known.

BRIEF DESCRIPTION OF THE DRAWINGS

The invention will now be described with reference to the drawings wherein:

FIG. 4b is a front view of the color filter of the vision testing system shown in FIG. 4a;

DESCRIPTION OF THE PREFERRED EMBODIMENTS OF THE INVENTION

The following will explain with reference to FIGS. 1a to 1e how the stereoscopic viewing impression is produced for an observer.

Figure 1A:
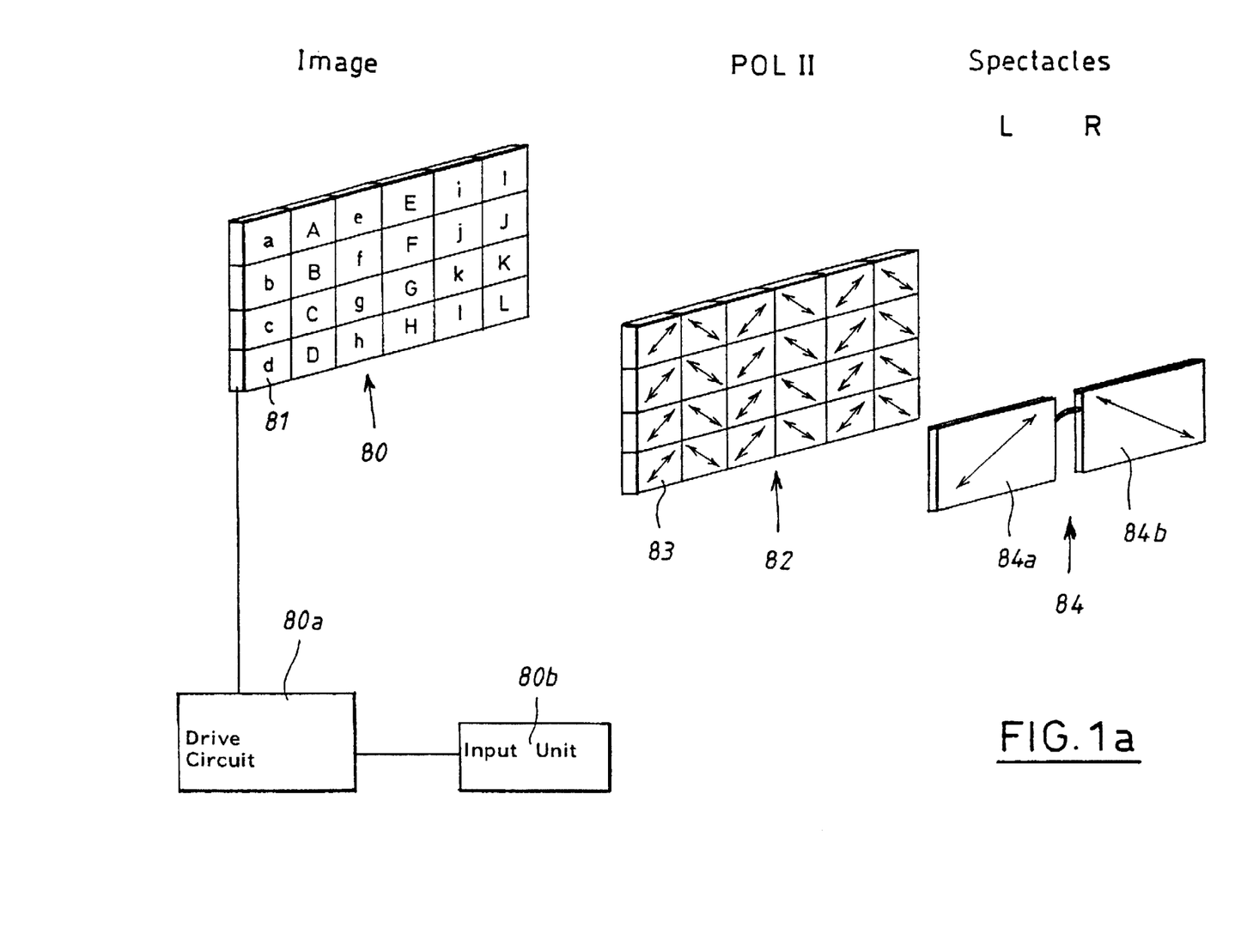
FIGS. 1a to 1e show respective image display units according to various embodiments of the invention.

In FIG. 1a, an image generating unit is shown which has a plurality of image display elements 81 (A to L, a to l). Each of the elements 81 is driven individually and is arranged on an image screen 80. The light emanating from the image display elements 81 incidents upon a vectograph film 82 arranged forward of the image screen 80. The vectograph film 82 has many individual polarization elements 83.

The individual polarization elements 83 have the same size and alignment as the individual image generating elements 81. The polarization elements 83 are arranged in strips with the polarization elements 83 of one strip having the same polarization direction. The polarization elements 83 in the strips arranged one next to the other have polarization axes which are mutually perpendicular.

The light passing through the vectograph film 82 is incident upon polarization spectacles 84 which has filter discs (84a, 84b) assigned to respective eyes of the observer. Each of the two filter discs (84a, 84b) has a polarization foil with the axes of the two polarization foils being mutually perpendicular.

It is possible to provide each eye of the test person with its own image by means of the image display system shown in FIG. 1a. The left eye of the test person sees the image of the image, generated by the image display elements 81 (a to i) through the left filter disc 84a of the polarization spectacles 84. On the other hand, the right eye of the test person sees the image of the image generated by the image display elements (A to L) through the right filter disc 84b of the polarization spectacles 84.

The image display unit as such comprises a light-emitting image screen 80 which has a fixed correlation to the image display elements 81.

The image screen 80 is driven by drive circuit 80a which is connected to an input unit 80b.

Figure 1B:
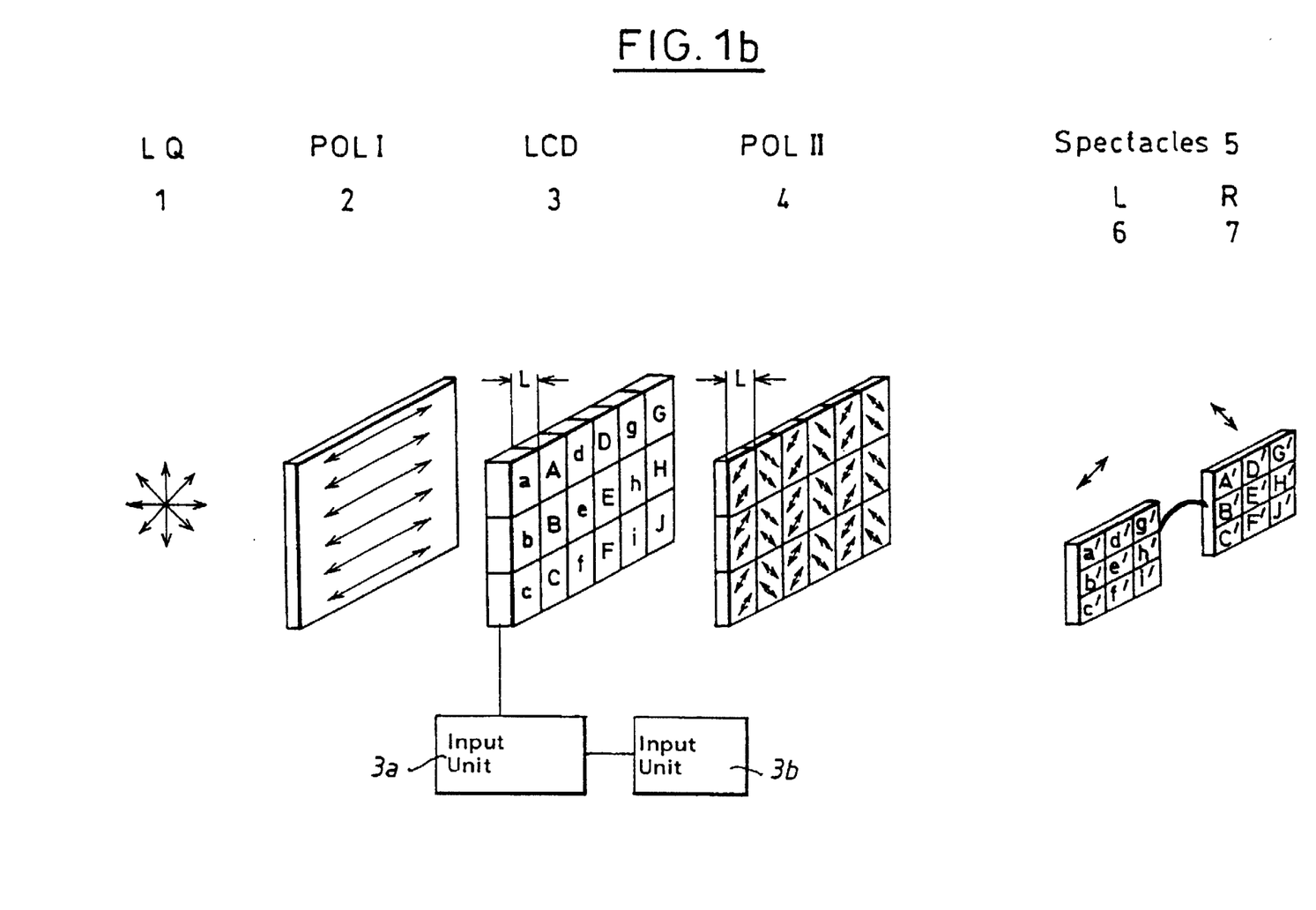

A further embodiment according to the invention is provided in FIG. 1b.

In FIG. 1b, the light emanates from the light source LQ 1 and a horizontal polarization is imparted thereto by a color-neutral transparent polarization filter POL I 2. Thereafter, the polarized light is incident upon the rear side of the liquid crystal display LCD 3 which comprises a plurality of individually drivable liquid crystal elements or cells (a to i, A to J). Each of the individual liquid crystal elements (a to i, A to J) can rotate the light by +45° or by −45°.

The LCD 3 serves as a flat image screen and a vectograph film POL II 4 is disposed directly forward of the LCD 3. This vectograph film 4 is basically a polarization filter which is configured so as to be arranged in strips. The strips of the vectograph film 4 lie directly next to each other and have the same width L as the LCD-elements (a to i, A to J); however, they have a polarization which is mutually perpendicular and alternates. The polarization axis of the polarization is rotated by 45° with respect to the polarization axis of the polarization filter POL I 2. However, the polarization axes of the elements of the vectograph film 4 can be rotated to 0° and 90° rather than ±45° depending upon the rotation at the LCD 3.

The LCD-elements (a to i) are individually drivable by the input unit 3b via the drive circuit 3a. These LCD-elements (a to i) simultaneously define the discrete image display areas and are used forward of the eye of the observer (not shown) for displaying an image on the left spectacle side L 6 of the spectacles 5. On the other hand, the discrete individually drivable LCD-elements (A to J) display and image on the right image side R 7 of the spectacles 5. The filter discs (6, 7) of the spectacles 5 also have polarization foils. The polarization foils have polarization axes which are arranged perpendicular to each other and parallel to the polarization axes of a vectograph film 4.

It should be noted that the liquid crystal displays normally comprise several hundred times several hundred LCD-elements so that no strips are visible when the observer is a sufficient distance from the display.

When a point as field a' is imaged on the left spectacle side 6, then the LCD-element (a) must rotate the light coming from the polarization filter POL I 2 by +45°. Then, the polarization axis of the light emanating from the LCD-element (a) coincides with the polarization axis of the strip of the vectograph film 4 disposed forward thereof and the polarization axis of the left spectacle side L 6 so that the light coming from the light source LQ 1 impinges in the eye of the test person (not shown). In this connection, reference should be made to FIG. 1c.

Figure 1C:
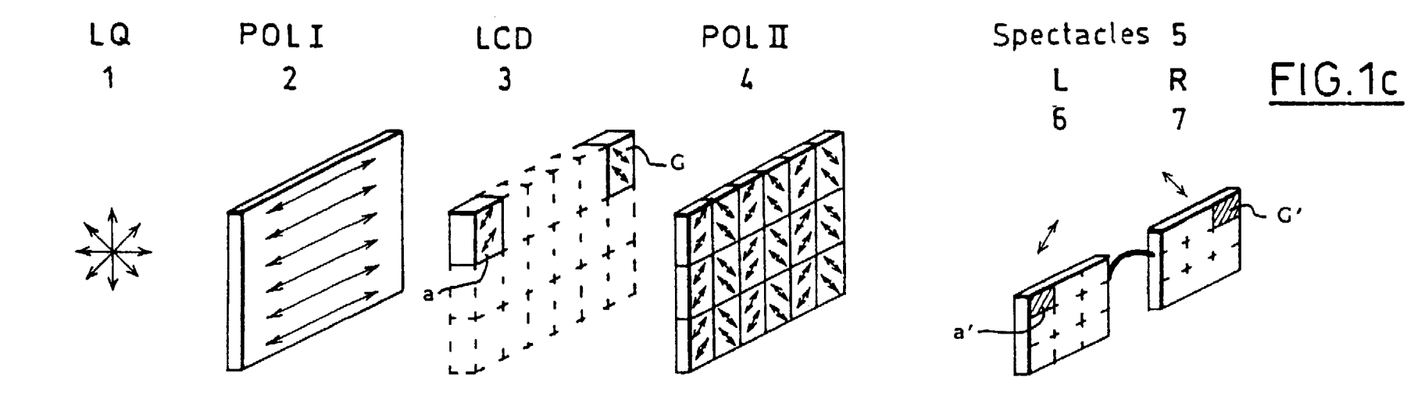
Figure 1D:
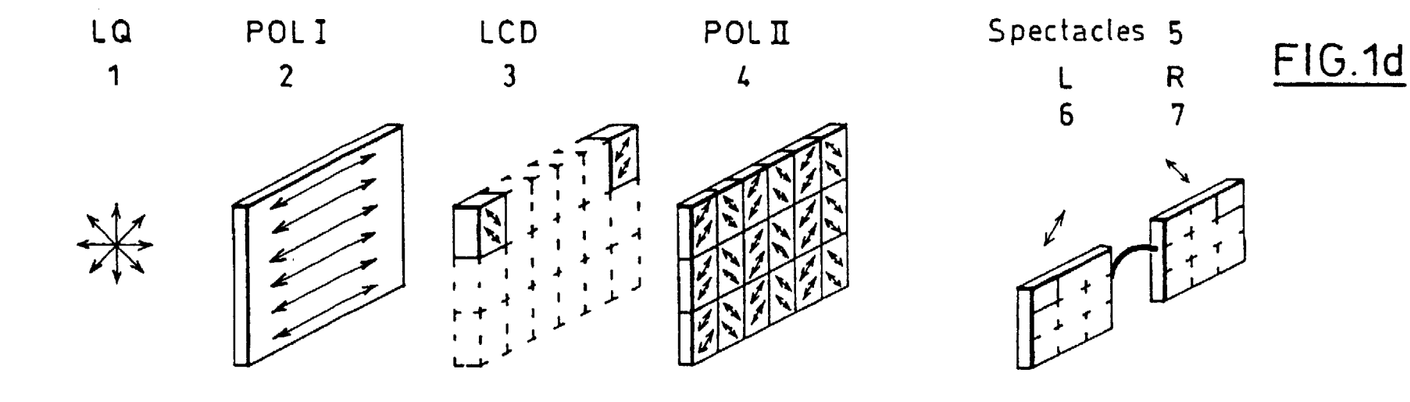

If, in contrast, the light of the light source LQ 1 is to fall into the right eye of the test person (not shown), then the LCD-element G must rotate the light coming from the polarization filter POL I 2 by −45°. Then the polarization axis of the light emanating from the LCD-element G coincides with the polarization axis of the strip of the vectograph film POL II 4 and with the polarization axis of the right spectacles side R 7. The strip of the vectograph film POL II 4 is disposed directly forward of the LCD-element G. In this way, a point G' is imaged on the right spectacles side R 7. Reference should also be made to FIG. 1c.

FIG. 1c shows for the LCD-elements G of the LCD-display LCD 3 how light is prevented from falling on the left or right filter disc (6, 7). If it is desired that no point is imaged as a field (a') on the left spectacles side 6, then the LCD-element (a) must rotate the light coming from the polarization filter POL I 2 by −45°. The polarization axis of the light emanating from the LCD-element (a) is then perpendicular to the polarization axis of the strip of vectograph film POL II 4 located directly forward of the LCD-element (a) and no light can reach the spectacles 5 from the LCD-element (a).

The same applies to the LCD-element G but here the LCD-element G must rotate the light coming from the polarization filter POL I 2 by +45°. Then here too the polarization axis of the light emanating from the LCD-element G is precisely perpendicular to the polarization axis of the strip of the vectograph film POL II 4 located directly forward of the LCD-element G and no light can reach the field (G') of the spectacles 5 from the LCD-element G.

The previous description shows that it is most important that the width L of the LCD-element (a to i, A to J) and the width L of the strips of the vectograph film POL II 4 precisely coincide and are arranged directly one over the other. Moire-effects can occur if adjustment is not precise. These adjusting difficulties can occur when adjusting the polarization grating of the vectograph film 4 with the line structure (a, A, d, D, g, G, . . . ) as well as the slit structure (a, b, c, . . . ) of the LCD-display 3. On the other hand, it is precisely this moire effect which assists in the adjustment since this effect is a good criterion for the precise centering of both structures one atop the other. An active matrix LCD is especially suitable as LCD-display 3.

Figure 1E:
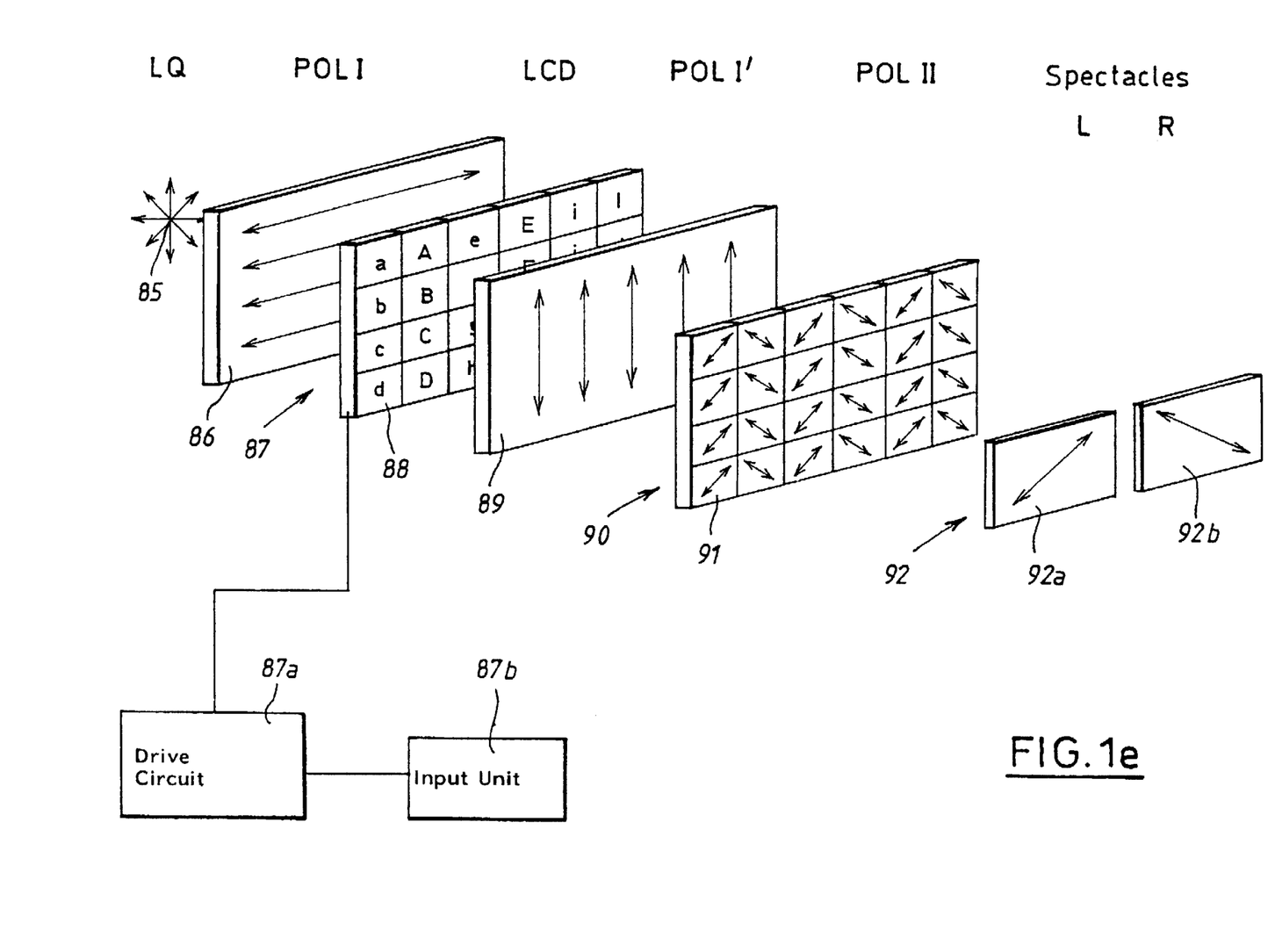

A further image display system is shown in FIG. 1e which comprises a light source LQ 85, a first polarization foil POL I 86, an image screen in the form of a transparent liquid crystal display LCD 87 with the image screen having a plurality of individually drivable image display areas 88 arranged in a fixed geometric arrangement, a second polarization foil POL I' 89, a vectograph film POL II 90 having a plurality of polarization elements 91, polarization spectacles 92 as well as an input unit 87b and a drive circuit 87a for driving the display 87.

The light coming from the light source 85 is linearly polarized by the first polarization foil POL I 86.

This polarized light impinges from the rear on the display LCD 87 with its many individually and spatially drivable image display areas 88 or liquid crystal cells. The image display areas 88 rotate the light passing therethrough by 90° when these areas are driven.

The light emanating from the display LCD 87 incidents upon the second polarization foil POL I' 89 and the polarization axis of this polarization foil is rotated by 90° with respect to the polarization axis of the first polarization foil POL I 86. Only the light rotated by the image display areas 88 can pass through the second polarization foil POL I' 89; whereas the light, which is not rotated by the image display areas 88, is blocked by the second polarization foil POL I' 89. The light coming from the second polarization foil POL I' 89 now incidents upon a vectograph film POL II 90 having a plurality of polarization elements 91 with the individual polarization elements 91 corresponding in size and alignment to the individual image display areas 88.

The light emanating from the vectograph film 90 incidents upon polarization spectacles 92 having two filter discs (92a, 92b) on which respective polarization foils are disposed. The polarization axis of the polarization foil on the one filter disc 92a is perpendicular to the polarization axis on the other polarization foil on the second filter disc 92b.

With the image display system shown in FIG. 1e, it is possible that the image display areas 88 (a to l) of the display 87 are imaged through the left filter disc 92a of the polarization spectacles 92 onto the left eye of the test person; whereas, the image display areas 88 (A to L) of the display 87 are imaged on the right eye of the test person via the right filter disc 92b of the polarization spectacles 92.

In summary, the operation of these arrangements is characterized in that one polarization direction is constantly assigned to one eye and the other polarization direction, which is perpendicular to the one polarization direction, is assigned to the other eye of the test person when the test person wears polarization spectacles having lenses with polarization axes which are mutually perpendicular and which are parallel to the polarization axes of the vectograph film.

The vectograph film is without effect for binocular vision, that is, without the polarization spectacles. The LCD-display operates in the normal state. The individual LCD-elements must then be correspondingly switched.

The basis for this arrangement to operate are the spatial summing characteristics of the receptor elements of the eye when utilizing the polarization spectacles.

The surface dimensions must satisfy certain conditions so that the LCD-display, which is necessary for carrying out the invention, and the vectograph film disposed on the forward side of the display fit together. This is explained with respect to FIG. 2. These conditions are necessary when each discrete LCD-element of the display is not assigned to a correspondingly large element of the vectograph film.

Figure 2:
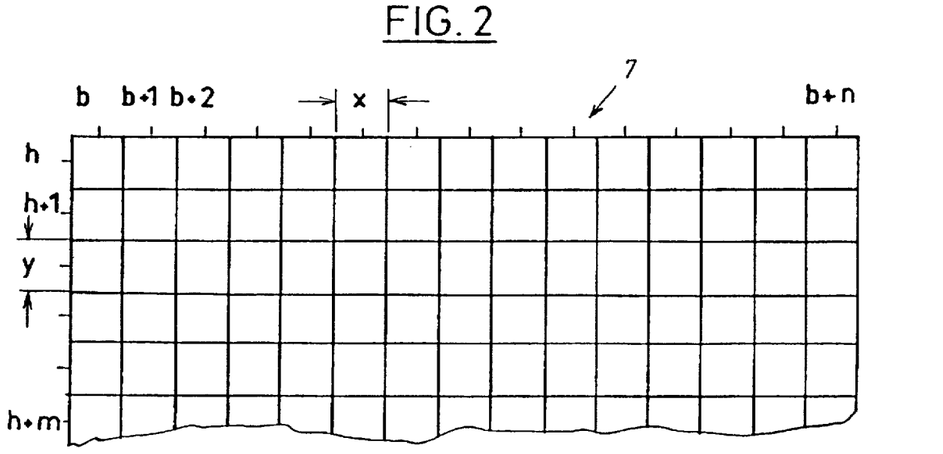
FIG. 2 is a schematic which represents the elements of a LCD-display surface as well as the elements of a vectograph film.

In the following, numeral (1) is associated with the elements of the LCD-display and numeral (2) is associated with the elements of the vectograph film.

In the display of FIG. 2, the horizontally arranged liquid crystal elements can be identified by: b(1), b(1)+1, b(1)+2, . . . , b(1)+n(1) and the vertically arranged liquid crystal elements can be identified by: h(1), h(1)+1, h(1)+2, h(1)+m(1). With this identification, the liquid crystal element at the upper left has the matrix address b(1), h(1) and the element at the bottom right has the matrix address b(1)+n(1), h(1)+m(1). The same applies to the surface elements of the vectograph film: b(2), b(2)+1, b(2)+2, . . . B(2)+n(2) and h(2), h(2)+1, H(2)+2, . . . H(2)+m(2). The lowercase letters pertain to elements viewed by the left eye and uppercase letters pertain to elements viewed by the right eye.

The conditions to be satisfied then are:

$$\Sigma b(1)+n(1)=z^*\Sigma b(2)+n(2); b(1)+n(1)>z$$

$$\Sigma h(1)+m(1)=z^*\Sigma h(2)+m(2); h(1)+m(1)>z$$

wherein N are real numbers and z is a variable within the range of real numbers N; that is, the number of the liquid crystal elements and of the corresponding surface elements of the vectograph film can only deviate from each other by an integer multiple without unsharp edges occurring at the figure displayed. Resolution losses, however, result with a display of figures except for z =1.

The following FIGS. 3, 4a, 4b, 5 and 6 are schematic diagrams with respect to which different embodiments of the invention will now be explained.

The description of the drawings which follows is directed only to vision testing systems. However, in addition to the purpose of vision testing, the arrangements shown in FIGS. 3 and 5 can be utilized as image display systems or flat display screens with stereoscopic image impression if a constant correlation of the image elements (LCD-elements) to the data to be transmitted is present.

The corresponding test figures can be displayed under different conditions for testing the different binocular and monocular vision functions.

Figure 3:
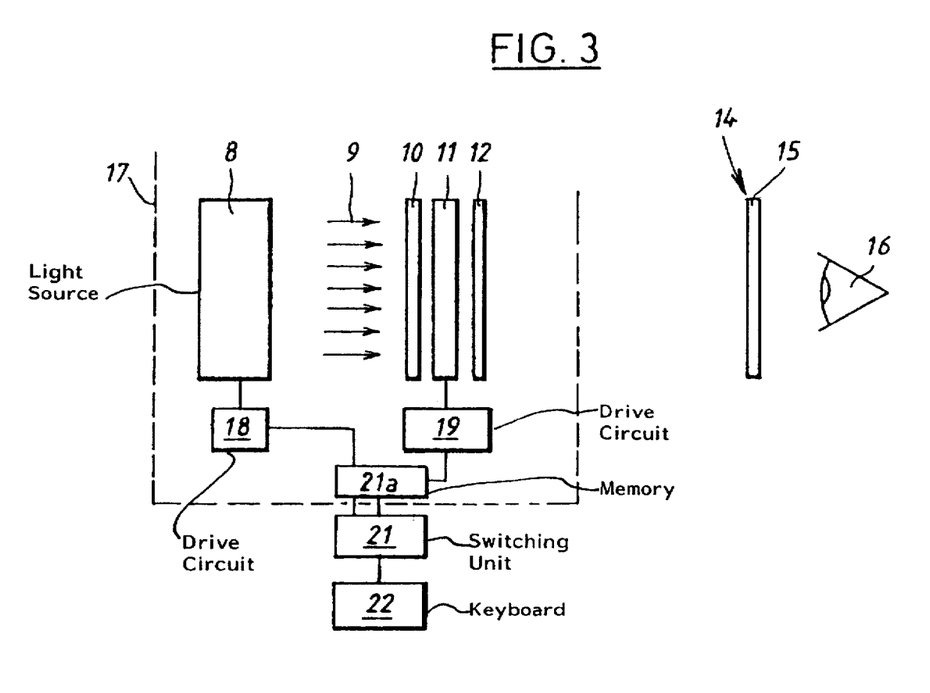
FIG. 3 is a schematic of an image display system according to one embodiment of the invention.

Referring to FIG. 3, spectacles 14 are placed on the test person for testing the binocular vision functions. The spectacles 14 are provided with a polarization filter disc 15 for each eye 16. The polarization filter discs 15 are so seated in the spectacles 14 that the polarization axes of the two polarization filter discs 15 are as perpendicular to each other as possible.

For carrying out the test of the binocular vision functions, the vision testing apparatus 17 must be able to provide at least the following types of display:

1) portions of the test figure appear dark for one eye against a bright background;

2) portions of the test figure appear bright for one eye against a dark background;

3) different portions of the test figure appear dark for both eyes against a bright background;

4) different portions of the test figure appear bright for both eyes against a dark background;

For items 1 and 2, the portions of the test figure visible to the one eye are invisible to the other eye.

The test of monocular vision functions can take place also without the polarization spectacles 14 with at least the following conditions being realized:

5) test figure appears for each eye dark against a bright background;

6) test figure appears for both eyes bright against a dark background.

The following conditions must be realized for checking the color discrimination:

7) portions of the test figure appear with different colors for the two eyes against a background of another color;

8a) test figure appears in color for both eyes against a bright background;

8b) test figure appears in color for both eyes against a dark background.

In order to realize conditions 1 to 4, the vision testing apparatus 17 of the invention must be configured as will now be described.

Referring again to FIG. 3, a light source 8 provides light 9 which illuminates a first color neutral transparent polarization foil 10. The light passing through the first polarization foil 10 penetrates a LCD-display 11, which serves as an image screen, and illuminates a color neutral vectograph film 12. The light passing through the vectograph film 12 leaves the vision testing apparatus 17.

A color neutral transparent polarization filter disc 15 is disposed forward of each eye 16 of the person to be tested. The LCD-display 11 is connected to a drive circuit 19. The drive circuit 19 is connected to a switching unit 21 which, in turn, is connected to memory 21a. The switching unit 21 can be influenced by an input unit in the form of a keyboard 22 and drives the drive circuit 19. The switching unit 21 and the keyboard 22 can be disposed in or on the vision testing apparatus 17 or can be connected via remote control to the apparatus 17. This remote control connection can be effected with a cable connection, infrared or ultrasonic connection. The keyboard 22 and the switching unit 21 effect a switchover of the test figures in the vision testing apparatus 17.

If it is desired to test the vision of the test person in dependence upon the luminous density and the contrast, then the light source 8 is additionally influenced as to its intensity via the light source drive circuit 18. The light source drive circuit 18 is driven by the switching unit 21 and is connected to the light source 8.

It is understood that monocular and binocular vision functions can be tested with this vision testing apparatus 17 without separating the vision impressions of the right and left eyes. The above conditions 5 and 6 also can be realized. The test person can continue to wear the polarization spectacles 14 or remove the same.

Figure 5:
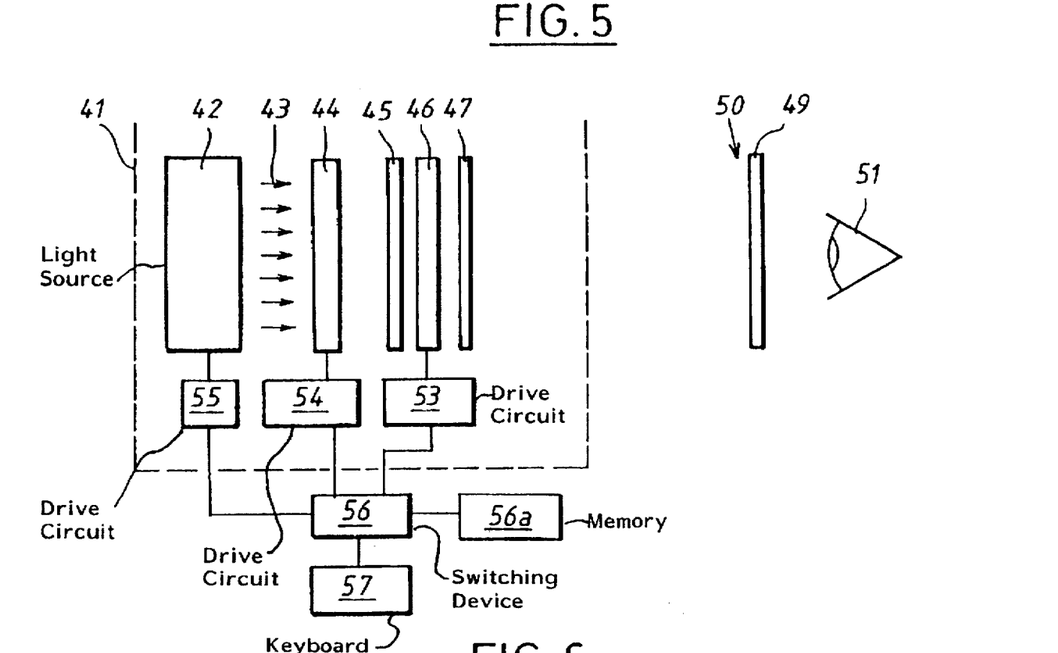
FIG. 5 is another embodiment of the vision testing system according to the invention; and, FIG. 6 is still another embodiment of the vision testing system according to the invention.
Figure 6:
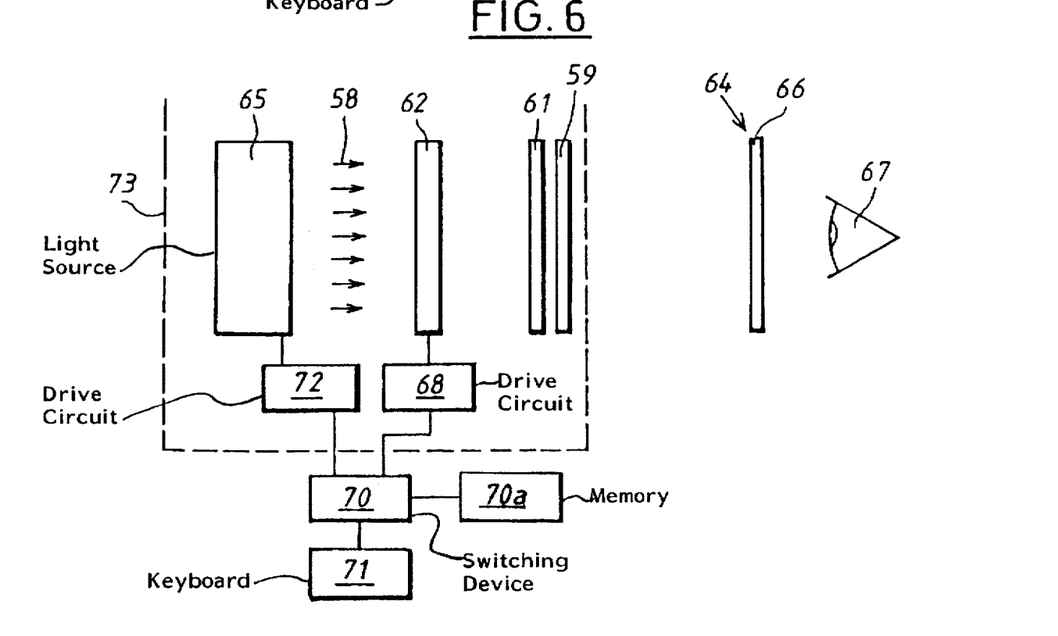

If a test as to the color discrimination of the test person is to be made, then the vision testing apparatus 17 must be able to display the test figures and also parts thereof in color. Vision testing systems according to the invention which are able to display the test figure completely or partially in color are shown in FIGS. 4a, 5 and 6 and will be described below.

Figure 4A:
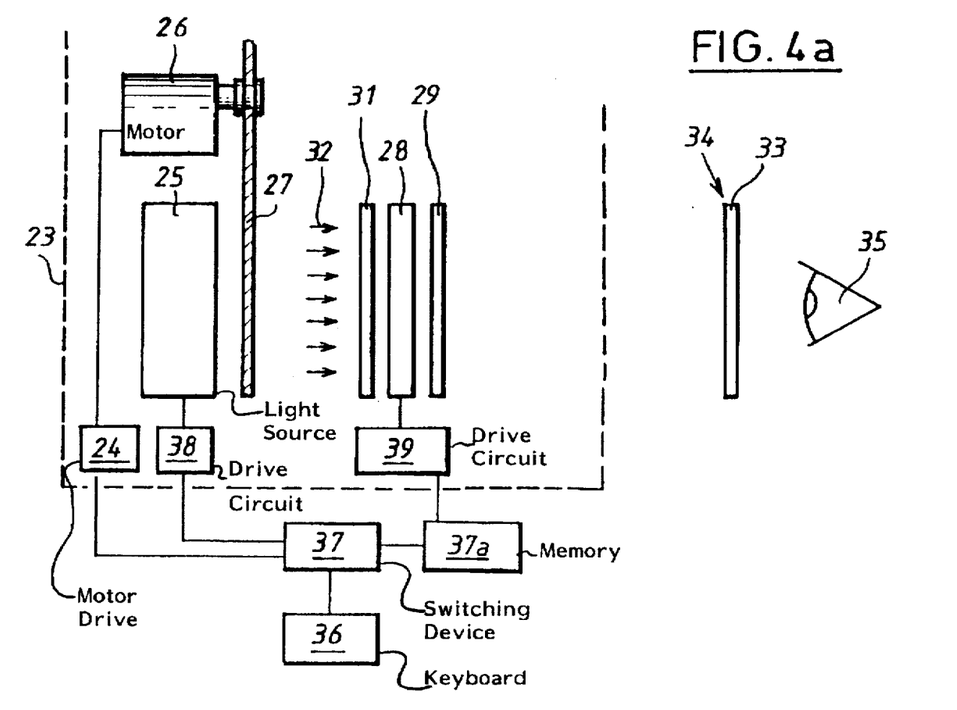
FIG. 4a is a schematic of a vision testing system having a color filter.

FIG. 4a shows the simplest configuration of such a vision testing apparatus 23 with which color discrimination can be tested. The apparatus 23 includes a polarization foil 31, an LCD-display 28 serving as an image screen and a vectograph film 29. The LCD-display 28 is connected via its drive circuit 39 to the switching device 37 on which a keyboard 36 is provided as an input unit. A memory 37a is disposed between the drive circuit 39 and the switching device 37. All of the test figures to be displayed are stored in the memory 37a.

Figure 4B:
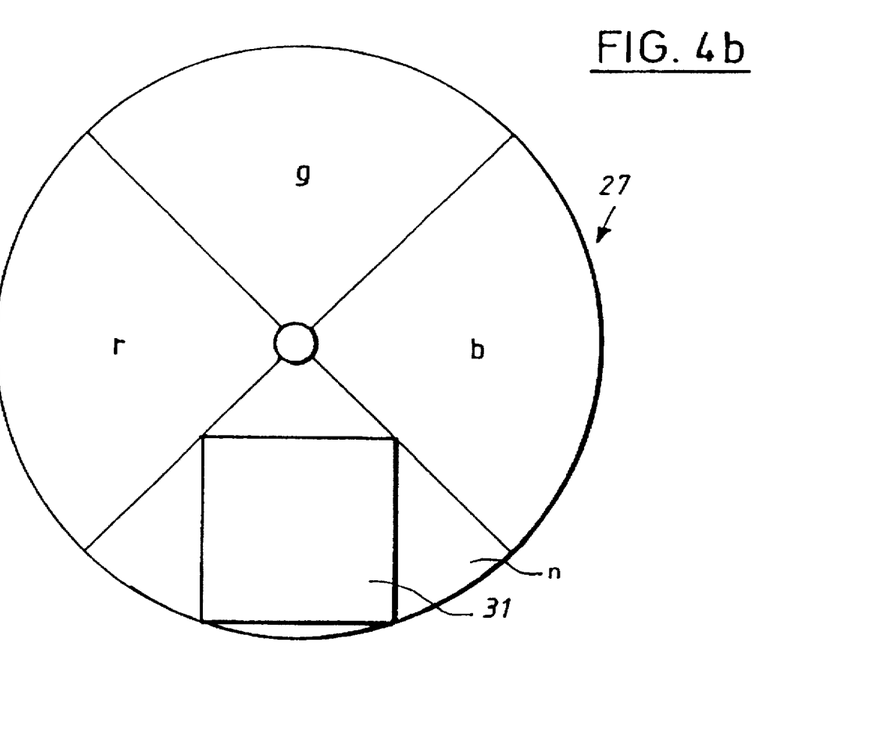

In addition to these elements of the vision testing apparatus, 17 already described with respect to FIG. 3, a color filter disc 27 is provided in the vision testing apparatus 23 which can be rotated by a motor 26. An input can be applied to the switching device 37 via the keyboard 36 in order to place a specific color filter in front of the light source 25. The light source drive circuit 38 is driven by the switching device 37 and is connected to the light source 25. As shown in FIG. 4b, this color can, for example, be red (r), yellow (y), blue (b) and neutral (n) as shown in FIG. 4b.

The instantaneous position of the color filter disc 27 is then checked in the switching device 37 and if the color filter disc 27 is not in the desired position, the motor drive 24 of the motor 26 causes the color filter disc 27 to be rotated into the desired position. In FIG. 4b, the color filter disc 27 is again shown in a front elevation view as well as the region of the polarization foil 31.

Only the color of the entire illuminating light 32 can be changed with the color filter disc 27 of FIGS. 4a and 4b. A color display with different colors is not possible. For this reason, the color filter disc 27 together with the motor 26 and the motor drive 24 are replaced in FIG. 5 by a color LCD 44 and the drive circuit 54. The drive circuit 54 is connected to the switching device 56. The color LCD 44 can be a color liquid crystal image-display device as disclosed in U.S. Pat. No. 4,877,309. A keyboard 57 is connected to this switching device 56 as an input unit.

The light 43 of the light source 42 first passes through the color LCD 44. There, the light is changed with respect to its color in the desired manner. Only then is the test figure generated by the polarization filter 45, the LCD-display 46 operating as an image screen and the vectograph film 47. The light source 42 can be influenced with respect to its intensity by the switching device 56 via the light source drive circuit 55. The LCD-display 46 is connected via its drive circuit 53 to the switching device 56. The switching device 56 is configured as a computer and has a memory 56a in which all test figures to be displayed are stored.

The eyes 51 of the test person can see a color image through the polarization spectacles 50 having the two polarization filter discs 49.

The resolution of this color LCD 44 must then be adapted to the resolution of the other LCD 46 in accordance with the embodiment for resolution.

A color presentation of the test figures to be displayed and a display of movable test figures is possible with the vision testing apparatus 41 configured as described above.

A simplification of the configuration of the vision testing apparatus 41 from FIG. 5 is obtained when the polarization filter POL I 2 and the LCD-display 3 are completely replaced by a color LCD 62 having a drive circuit 68 (see FIG. 6). The color LCD 62 itself serves as an image screen and transmits linearized polarized light.

The light 58 of the light source 65 then first penetrates the color LCD 62. The light emanating from the color LCD 62 having the desired test figure is rotated by the color LCD 62 in the desired manner. The light source drive circuit 72 and the drive circuit 68 of the color LCD 62 can be influenced via the switching device 70 with a keyboard 71 as an input unit. The switching device 70 is configured as a computer and has a memory 70a wherein all figures to be displayed are stored. The vectograph film 61 and a λ/4-foil 59 are disposed forward of the LCD-display 62. The λ/4-foil 59 circularly polarizes the light passing therethrough either to the right or to the left.

Polarization foils as well as λ/4-foils 66 are disposed on the filter discs in the spectacles 64 forward of the eyes 67 of the test person so that the conditions 1 to 7, 8a and 8b can be realized for testing the vision of the test person.

The use of the λ/4-foils on the polarization foils (61, 64) affords the advantage that now even for a turned position of the head of the test person, the eyes of the test person only see what they are intended to see.

The vision testing apparatus according to the invention is characterized by its compact disturbance-resistant configuration and permits a check of the monocular and binocular vision functions as well as a check of the color discrimination of the test person.

The described polarization spectacles can also be configured as an accessory which can be mounted and thus can be placed on the conventional spectacles of the test person for checking the vision functions.

It is understood that the foregoing description is that of the preferred embodiments of the invention and that various changes and modifications may be made thereto without departing from the spirit and scope of the invention as defined in the appended claims.

What is claimed is:

1. A vision testing system for stereoscopic viewing by a test person, the system comprising:

an image display emitting polarized light and having a plurality of image display elements for displaying respective images and said image display elements being arranged in said image display to have a fixed geometrical arrangement to each other;

a vectograph film disposed forward of said image display and having a plurality of polarization elements with each of said polarization elements completely covering at least one of said image display areas;

said polarization elements being arranged on said vectograph film in strip or checkerboard pattern;

each of said polarization elements defining a polarization axis and the respective polarization axes of each two mutually adjacent ones of said polarization elements being mutually perpendicular;

polarization spectacles with which the test person can view the image display through said vectograph film;

said polarization spectacles having two filter discs having respective polarization foils;

said polarization foils having respective polarization axes which are mutually perpendicular and one of said polarization axes of said polarization foils extending in the same direction as the polarization axes of a first portion of said polarization elements being assigned to one eye of the test person and the other one of said polarization axes of said polarization foils extending in the same direction as the polarization axes of a second portion of said polarization elements and being assigned to the other eye of the test person;

input means for effecting changes on said image display;

a drive circuit connected to said image display for individually driving each of said image display elements so as to permit separate test images to be formed for each eye of the test person;

a nonvolatile permanent memory for permanently storing a plurality of different ones of said test images to be displayed on said image display;

said nonvolatile permanent memory being addressable by said input means to transmit selected signals indicative of selected ones of said images to be displayed; and, said nonvolatile permanent memory being connected to said drive circuit for transmitting said selected signals to said image display elements for changing said images on said image display to said selected ones of said images.

2. The vision testing system of claim 1, said memory being in a computer.

3. The vision testing system of claim 2, said image display being a flat image screen.

4. The vision testing system of claim 3, said image display having a rearward side and said system further comprising at least one light source mounted at said rearward side for emitting light transilluminating said image display.

5. The vision testing system of claim 4, further comprising a switching device interposed between said light source and said input means; and, said switching device being adapted to change the intensity of the light of said light source.

6. The vision testing system of claim 4, said image display being an LCD-display having a plurality of LCD-elements for generating a corresponding plurality of images in a fixed spatial relationship to each other; and, said system further comprising a first additional polarization foil interposed between said light source and said LCD-display and having a polarization axis at 45° to said polarization axes of said polarization elements of said vectograph film.

7. The vision testing system of claim 6, further comprising a second additional polarization foil interposed between said LCD-display and said vectograph film having a polarization axis which is perpendicular or parallel to said polarization axes of said first additional polarization foil.

8. The vision testing system of claim 6, said LCD-display being an LCD-display generating color images.

9. The vision testing system of claim 8, further comprising a first λ/4-foil disposed forward of said vectograph film downstream of said light source; and, a second λ/4-foil disposed on said filter discs of said polarization spectacles.

10. The vision testing system of claim 9, said image display elements of said image display being adapted to display test figures for testing the vision of a test person.

11. The vision testing system of claim 1, said drive circuit and said input means being conjointly adapted to provide test figures selectably movable across said image display elements.

12. The vision testing system of claim 1, said drive circuit and said input means being conjointly adapted to drive individual ones of said image display elements.

13. The vision testing system of claim 1, said input means comprising a keyboard and a switching unit connecting said keyboard to said drive circuit.

14. A vision testing system for stereoscopic viewing by a test person, the system comprising:

an image display emitting polarized light and having a plurality of image display elements for displaying respective images and said image display elements being arranged in said image display to have a fixed geometrical arrangement to each other;

a vectograph film disposed forward of said image display and having a plurality of polarization elements with each of said polarization elements completely covering at least one of said image display areas;

said polarization elements being arranged on said vectograph film in strip or checkerboard pattern;

each of said polarization elements defining a polarization axis and the respective polarization axes of each two mutually adjacent ones of said polarization elements being mutually perpendicular;

polarization spectacles with which the test person can view the image display through said vectograph film;

said polarization spectacles having two filter discs having respective polarization foils;

said polarization foils having respective polarization axes which are mutually perpendicular and one of said polarization axes of said polarization foils extending in the same direction as the polarization axes of a first portion of said polarization elements being assigned to one eye of the test person and the other one of said polarization axes of said polarization foils extending in the same direction as the polarization axes of a second portion of said polarization elements and being assigned to the other eye of the test person;

input means for effecting changes on said image display;

a drive circuit connected to said image display for individually driving each of said image display elements so as to permit separate test images to be formed for each eye of the test person;

a nonvolatile permanent memory for permanently storing a plurality of different ones of said test images to be displayed on said image display;

said nonvolatile permanent memory being addressable by said input means to transmit selected signals indicative of selected ones of said images to be displayed;

said nonvolatile permanent memory being connected to said drive circuit for transmitting said selected signals to said image display elements for changing said images on said image display to said selected ones of said images;

said image display having a rearward side;

at least one light source mounted at said rearward side for emitting light transilluminating said image display;

color changing means for changing the color of said light emitted by said light source; and, a switching device connecting said input means to said color changing means for actuating said color changing means to change the color of the light emitted by said light source.

* * * * *

UNITED STATES PATENT AND TRADEMARK OFFICE
CERTIFICATE OF CORRECTION

PATENT NO. : 5,638,082
DATED : June 10, 1997
INVENTOR(S) : Wolfgang Grimm

It is certified that error appears in the above-indentified patent and that said Letters Patent is hereby corrected as shown below:

In column 1, line 9, delete "individual" and substitute -- individually -- therefor.

In column 1, line 48, delete "image." and substitute -- images. -- therefor.

In column 6, line 15, between "image" and "generated", please delete ".".

In column 13, line 6, delete "axes" and substitute -- axis -- therefor.

Signed and Sealed this

Ninth Day of September, 1997

Attest:

BRUCE LEHMAN

Attesting Officer

Commissioner of Patents and Trademarks